(12) United States Patent
Teranishi et al.

(10) Patent No.: US 9,529,222 B2
(45) Date of Patent: Dec. 27, 2016

(54) DISPLAY DEVICE

(71) Applicant: Japan Display Inc., Minato-ku (JP)

(72) Inventors: Yasuyuki Teranishi, Tokyo (JP); Daisuke Ito, Tokyo (JP)

(73) Assignee: Japan Display Inc., Minato-ku (JP)

( * ) Notice: Subject to any disclaimer, the term of this patent is extended or adjusted under 35 U.S.C. 154(b) by 121 days.

(21) Appl. No.: 14/526,955

(22) Filed: Oct. 29, 2014

(65) Prior Publication Data

US 2015/0177574 A1  Jun. 25, 2015

(30) Foreign Application Priority Data

Dec. 19, 2013 (JP) ................................ 2013-262679
May 23, 2014 (JP) ................................ 2014-106860

(51) Int. Cl.
| | | |
|---|---|---|
| G06F 3/044 | (2006.01) | |
| G02F 1/1333 | (2006.01) | |
| G06F 3/042 | (2006.01) | |
| G06F 3/041 | (2006.01) | |
| G02F 1/1343 | (2006.01) | |

(52) U.S. Cl.
CPC ..... *G02F 1/13338* (2013.01); *G02F 1/134363* (2013.01); *G06F 3/042* (2013.01); *G06F 3/044* (2013.01); *G06F 3/0412* (2013.01); *G02F 2001/134372* (2013.01)

(58) Field of Classification Search
CPC ............ G02F 1/13338; G02F 1/134363; G02F 2001/134372; G06F 3/0412; G06F 3/044; G06F 3/042
USPC ............................................. 345/76–92, 204
See application file for complete search history.

(56) References Cited

U.S. PATENT DOCUMENTS

2013/0300705 A1   11/2013   Goo et al.

FOREIGN PATENT DOCUMENTS

| CN | 102169248 A | 8/2011 |
|---|---|---|
| CN | 103226423 A | 7/2013 |
| JP | 4410488 | 2/2010 |
| JP | 2012-252206 A | 12/2012 |

(Continued)

OTHER PUBLICATIONS

Chinese Office Action issued Aug. 2, 2016 in Chinese Patent Application No. 201410636560.6 (with English translation), 10 pages.

*Primary Examiner* — Amare Mengistu
*Assistant Examiner* — Stacy Khoo
(74) *Attorney, Agent, or Firm* — Oblon, McClelland, Maier & Neustadt, L.L.P.

(57) ABSTRACT

According to one embodiment, a display device includes first interconnects, second interconnects, third interconnects, fourth interconnects, switch elements, pixel electrodes, a first insulating layer, a display layer, and a control unit. Each of the switch elements is electrically connected to one of the first interconnects and one of the second interconnects. The pixel electrodes are electrically connected respectively to the switch elements. The first insulating layer is provided between the second and third interconnects. The fourth interconnects are separated from the first to third interconnects, the switch elements, and the pixel electrodes. The display layer is provided between the pixel electrodes and the fourth interconnects. The display layer performs an optical operation of one of a light emission and a change of an optical characteristic. The control unit performs a sense operation, a first display operation, a second display operation, and a pre-display operation.

20 Claims, 6 Drawing Sheets

(56) References Cited

FOREIGN PATENT DOCUMENTS

| | | |
|---|---|---|
| JP | 2013-84168 | 5/2013 |
| JP | 2013-109670 A | 6/2013 |
| KR | 10-2013-0033641 A | 4/2013 |
| TW | 201348798 A | 12/2013 |

DISPLAY DEVICE

CROSS-REFERENCE TO RELATED APPLICATIONS

This application is based upon and claims the benefit of priority from Japanese Patent Application No. 2013-262679, filed on Dec. 19, 2013, and the Japanese patent Application No. 2014-106860, filed on May 23, 2014; the entire contents of which are incorporated herein by reference.

FIELD

Embodiments described herein relate generally to a display device.

BACKGROUND

Display devices that use liquid crystals, organic EL, etc., are being developed. There are cases where, for example, input functions for touch input are provided in the display devices. Uniform displays are necessary in the display devices.

SUMMARY OF THE INVENTION

According to one embodiment, a display device includes a plurality of first interconnects, a plurality of second interconnects, a plurality of third interconnects, a plurality of fourth interconnects, a plurality of switch elements, a plurality of pixel electrodes, a first insulating layer, a display layer, and a control unit. The first interconnects extend in a first direction to be arranged in a second direction intersecting the first direction. The second interconnects extend in the second direction to be arranged in the first direction. Each of the switch elements is electrically connected to one selected from the first interconnects and one selected from the second interconnects. The pixel electrodes are electrically connected respectively to the switch elements. The third interconnects extend in a third direction to be arranged in a fourth direction. The third direction is parallel to a plane including the first direction and the second direction. The fourth direction intersects the third direction and is parallel to the plane. The first insulating layer is provided between the second interconnects and the third interconnects. The fourth interconnects are separated from the first to third interconnects, the switch elements, and the pixel electrodes in a fifth direction. The fifth direction is perpendicular to the plane. The fourth interconnects extend in the fourth direction to be arranged in the third direction. The display layer performs an optical operation of at least one selected from a light emission and a change of an optical characteristic based on an electrical signal provided to the pixel electrodes. The display layer is provided between the pixel electrodes and the fourth interconnects. The control unit performs a sense operation in a sensing interval, the sense operation including sensing an electrical characteristic between the fourth interconnects and a selected third interconnect of the third interconnects, the selected third interconnect being in a selected state, a first display operation in a first display interval after the sensing interval, the first display operation including causing the display layer to perform the optical operation by controlling a potential of the pixel electrodes by supplying a first scanning signal to at least one selected from the first interconnects and setting the second interconnects to a display potential, a second display operation in a second display interval prior to the sensing interval, the second display operation including causing the display layer to perform the optical operation by controlling the potential of the pixel electrodes by supplying a second scanning signal to at least one selected from the first interconnects and setting the second interconnects to the display potential, and a pre-display operation in a pre-display interval after the sensing interval and prior to the first display interval, the pre-display operation including a first voltage application operation of setting at least one of the second interconnects to a pre-display potential. An absolute value of the pre-display potential is greater than an absolute value of the display potential.

DETAILED DESCRIPTION

Figure 1:
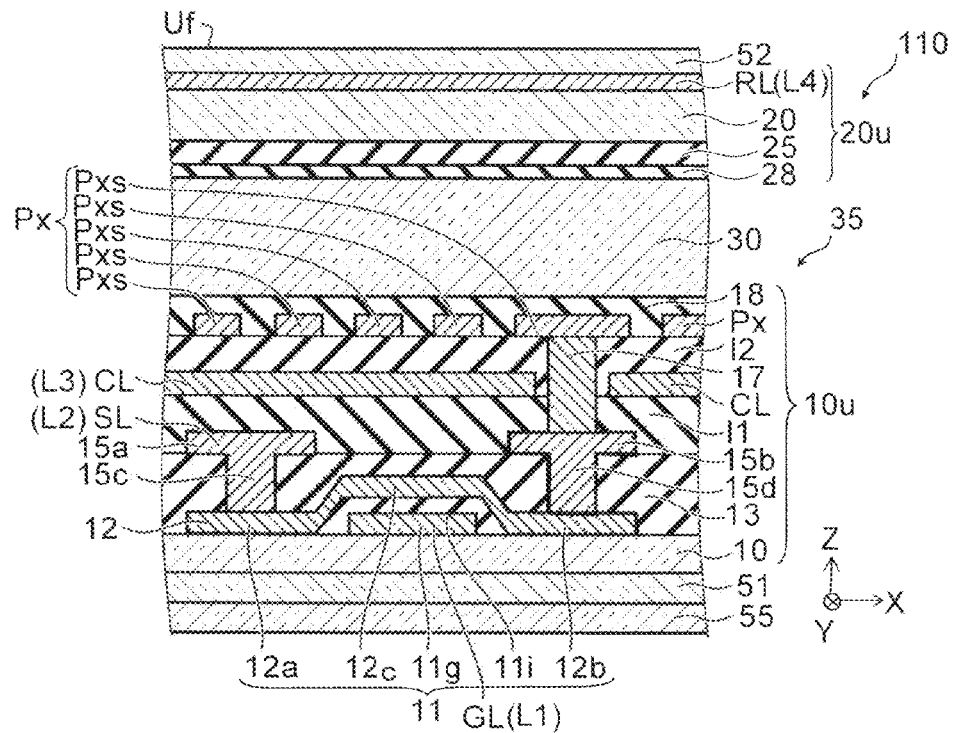
FIG. 1 is a schematic cross-sectional view illustrating a display device according to a first embodiment.

Embodiments of the invention will now be described with reference to the drawings.

The disclosures are merely examples; and appropriate modifications within the spirit of the invention that are easily conceivable by one skilled in the art are, of course, within the scope of the invention. Further, although the widths, thicknesses, configurations, etc., of portions are shown schematically compared to the actual aspects for clarity of description in the drawings, these are merely examples; and the construction of the invention is not limited thereto.

Further, in the specification and the drawings, components similar to those described in regard to a drawing thereinabove are marked with like reference numerals, and a detailed description is omitted as appropriate.

First Embodiment

FIG. 1 is a schematic cross-sectional view illustrating a display device according to a first embodiment.

As shown in FIG. 1, a first substrate unit 10u, a second substrate unit 20u, and a display layer 30 are provided in the display device 110 according to the embodiment. In the example, a liquid crystal is used as the display layer 30. As described below, an organic light emitting layer, etc., may be used as the display layer 30. Multiple pixels 35 are provided in the display device 110. FIG. 1 illustrates a portion of one pixel 35.

For example, a TFT (thin film transistor) array substrate is used as the first substrate unit 10u. For example, a first substrate 10, gate lines GL (first interconnects L1), switch elements 11, signal lines SL (second interconnects L2), common lines CL (third interconnects L3), and pixel electrodes Px are provided in the first substrate unit 10u.

For example, the gate lines GL and the signal lines SL extend in, for example, the X-Y plane. One direction parallel to the X-Y plane is an X-axis direction. A direction parallel to the X-Y plane and perpendicular to the X-axis direction is a Y-axis direction. A direction perpendicular to the X-Y plane is a Z-axis direction. The first substrate unit 10u extends in the X-Y plane. In the example, the first substrate 10 is light-transmissive. The first substrate 10 includes, for example, glass or a resin. The gate lines GL are provided on the first substrate 10.

In the example, a TFT is used as the switch element 11. The switch element 11 includes a semiconductor layer 12. The semiconductor layer 12 includes a first portion 12a, a second portion 12b, and a third portion 12c. The second portion 12b is separated from the first portion 12a in the X-Y plane. The third portion 12c is disposed between the first portion 12a and the second portion 12b when projected onto the X-Y plane. The first portion 12a is one selected from the source and the drain of the switch element 11. The second portion 12b is the other selected from the source and the drain. The third portion 12c is the channel portion of the switch element 11.

The switch element 11 further includes a gate 11g and a gate insulator film 11i. The gate insulator film 11i is provided between the third portion 12c and the gate 11g. In the example, the third portion 12c is disposed on the gate 11g. In the example, the switch element 11 has a bottom-gate structure. In the embodiment, the switch element 11 may have a top-gate structure.

At least one selected from the gate line GL and the gate 11g includes a first metal layer. The first metal layer includes, for example, at least one selected from Mo (molybdenum), MoW (molybdenum-tungsten), Al (aluminum), and Cu (copper). For example, the first metal layer includes Mo.

The semiconductor layer 12 includes, for example, at least one selected from polysilicon (polycrystalline silicon), amorphous silicon (amorphous silicon), and crystalline silicon. An oxide semiconductor may be used as the semiconductor layer 12. For example, the semiconductor layer 12 may include an oxide including at least one selected from indium (In), gallium (Ga), and zinc (Zn).

The signal line SL is electrically connected to the first portion 12a. In the example, a portion (a first connection portion 15a) of the signal line SL is electrically connected to the first portion 12a. In the example, the first connection portion 15a is electrically connected to the first portion 12a by a first connecting conductive portion 15c.

In the embodiment, the state of being electrically connected includes the state in which two conductors are in direct contact and the state in which a current flows between two conductors that have another conductor inserted therebetween. Further, the state of being electrically connected includes the state in which it is possible to form a state in which a current flows between two conductors that have an element (e.g., a switch element or the like) inserted therebetween.

On the other hand, a second connecting conductive portion 15d is provided on the second portion 12b. A second connection portion 15b is provided on the second connecting conductive portion 15d.

The first connection portion 15a (the signal line SL), the first connecting conductive portion 15c, the second connection portion 15b, and the second connecting conductive portion 15d include a second metal layer. The second metal layer includes, for example, at least one selected from Al (aluminum) and Cu (copper). For example, the second metal layer includes Al.

An inter-layer insulating layer 13 is provided between the first connection portion 15a (the signal line SL) and the semiconductor layer 12, between the first connecting conductive portion 15c and the semiconductor layer 12, between the second connection portion 15b and the semiconductor layer 12, and between the second connecting conductive portion 15d and the semiconductor layer 12.

The inter-layer insulating layer 13 includes, for example, a metal oxide, etc. The inter-layer insulating layer 13 includes, for example, at least one selected from silicon oxide, silicon nitride, and silicon oxynitride.

In the example, the common line CL is provided on the second metal layer of the signal line SL, etc. A first insulating layer I1 is provided between the common line CL and the signal line SL. As described below, the display device 110 includes multiple signal lines SL and multiple common lines CL. In such a case, the first insulating layer I1 is provided between the multiple signal lines SL and the multiple common lines CL.

The first insulating layer I1 functions as, for example, a planarization layer. For example, the first insulating layer I1 includes an organic material. The first insulating layer I1 includes, for example, at least one selected from an acrylic resin and a polyimide resin. Good flatness is obtained by using the organic material as the first insulating layer I1.

The pixel electrode Px is provided on the common line CL. In the example, the pixel electrode Px has a comb-shaped configuration; and the pixel electrode Px includes multiple portions Pxs having band configurations. The multiple portions Pxs are separated from each other in the X-Y plane. The pixel electrode Px is electrically connected to the second connection portion 15b. In the example, the pixel electrode Px is electrically connected to the second connection portion 15b by a third connecting conductive portion 17.

At least one selected from the common line CL and the pixel electrode Px includes, for example, a conductive layer that is light-transmissive. For example, at least one selected from the common line CL and the pixel electrode Px includes an oxide including at least one element selected from the group consisting of In, Sn, Zn, and Ti. The common line CL and the pixel electrode Px may include, for example, ITO (Indium Tin Oxide), etc. For example, a thin metal layer that is light-transmissive may be used as the common line CL and/or the pixel electrode Px.

At least one switch element 11 and at least one pixel electrode Px are provided in each of the multiple pixels 35. In other words, the multiple switch elements 11 are provided respectively in the multiple pixels 35. The multiple pixel electrodes Px are provided respectively in the multiple pixels 35.

A second insulating layer I2 is provided between the pixel electrode Px and the common line CL. In the example, at least a portion of the multiple common lines CL is disposed between at least a portion of one selected from the multiple pixel electrodes Px and at least a portion of one selected from the multiple signal lines SL. The second insulating layer I2 is disposed between the at least a portion of the multiple common lines CL recited above and the at least a portion of the one selected from the multiple pixel electrodes Px recited above.

The second insulating layer I2 may include, for example, the same material as the first insulating layer I1. The second insulating layer I2 may include, for example, a metal compound (an oxide, a nitride, an oxynitride, etc.). The material of the second insulating layer I2 is arbitrary.

In the example, a first alignment film 18 is provided on the pixel electrode Px.

The second substrate unit 20u is separated from the first substrate unit 10u in the Z-axis direction. In the example, the second substrate unit 20u includes a second substrate 20, a color filter layer 25, a second alignment film 28, and a sense line RL (a fourth interconnect L4). The second substrate 20 is provided between the sense line RL and the first substrate unit 10u. The color filter layer 25 is provided between the second substrate 20 and the first substrate unit 10u. The second alignment film 28 is provided between the color filter layer 25 and the first substrate unit 10u.

In the example, the second substrate 20 is light-transmissive. The second substrate 20 includes, for example, glass or a resin.

The sense line RL is, for example, light-transmissive. The sense line RL includes an oxide (e.g., ITO, etc.) including at least one element selected from the group consisting of In, Sn, Zn, Ti, etc. A thin metal layer that is light-transmissive may be used as the sense line RL.

The color filter layer 25 includes, for example, a red colored layer, a green colored layer, a blue colored layer, etc. The red colored layer, the green colored layer, and the blue colored layer are disposed to respectively correspond to the multiple pixels 35. The color filter layer 25 may have four or more colors. In the embodiment, the color filter layer 25 may be omitted. The color filter layer may be provided in the first substrate unit 10u.

The first alignment film 18 and the second alignment film 28 include, for example, polyimide, etc. These alignment films perform alignment processing (e.g., rubbing, etc.) as necessary.

The display layer 30 is provided between the first substrate unit 10u and the second substrate unit 20u. As described below, multiple pixel electrodes Px and multiple sense lines RL are provided. The display layer 30 is disposed between the multiple pixel electrodes Px and the multiple sense lines RL. For example, the display layer 30 is disposed between the first alignment film 18 and the second alignment film 28.

The display layer 30 performs an optical operation based on, for example, an electrical signal provided to the multiple pixel electrodes Px. For example, in the case where a liquid crystal layer is used as the display layer 30, the optical operation includes a change of an optical characteristic. For example, in the case where a light emitting layer (e.g., an organic light emitting layer) is used as the display layer 30, the optical operation includes a light emission (the emission of light). In other words, the display layer 30 performs an optical operation of at least one selected from a light emission and a change of an optical characteristic.

In the case where the display layer 30 includes a liquid crystal layer, a change of an optical characteristic occurs. The optical characteristic includes, for example, at least one selected from birefringence, optical rotatory properties, scattering properties, optical reflectance, and optical absorptance. For example, the liquid crystal alignment of the display layer 30 (the liquid crystal layer) changes and the effective birefringence changes due to the electrical signal provided to the pixel electrode Px. At least one selected from optical rotatory properties, scattering properties, optical reflectance, and optical absorptance may change.

A first polarizing layer 51 and a second polarizing layer 52 are provided in the example. The first substrate unit 10u is disposed between the first polarizing layer 51 and the second polarizing layer 52. The second substrate unit 20u is disposed between the first substrate unit 10u and the second polarizing layer 52.

A backlight unit 55 is further provided in the example. The first polarizing layer 51, the first substrate unit 10u, the display layer 30, and the second substrate unit 20u are disposed between the backlight unit 55 and the second polarizing layer 52. The backlight unit 55 emits light. The light passes through the first polarizing layer 51, the first substrate unit 10u, the display layer 30, the second substrate unit 20u, and the second polarizing layer 52 and is emitted outside the display device 110.

In the example, the pixel electrode Px includes the multiple portions Pxs having band configurations. A "lateral electric field" is generated between the pixel electrode Px and the common line CL. The lateral electric field has a component parallel to the X-Y plane. The director of the liquid crystal molecules (the long-axis direction of the liquid crystal molecules) of the display layer 30 (the liquid crystal layer) is caused to change in the X-Y plane by the lateral electric field. For example, at least one selected from birefringence and optical rotatory properties changes due to the change of the direction of the director. In other words, the change of the optical characteristic occurs.

The transmittance of the light emitted from the backlight unit 55 changes due to the change of the optical characteristic. The transmittance of the light changes, that is, the brightness changes according to the electrical signal (the image signal) provided to the pixel electrode Px. The light of which the brightness has changed is emitted from an upper surface Uf of the display device 110. Thereby, the display is performed.

Figure 2:
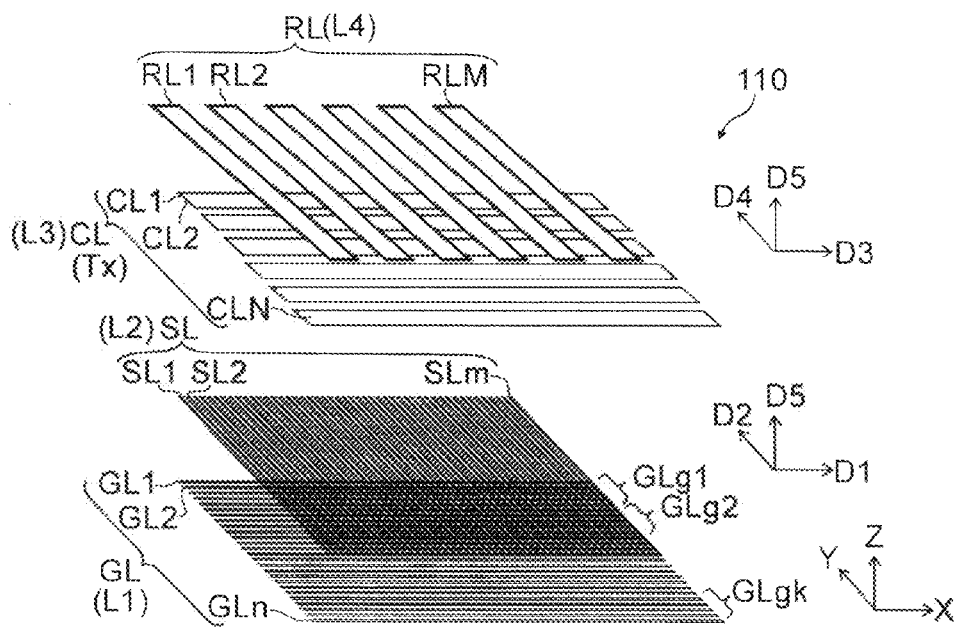
FIG. 2 is a schematic perspective view illustrating the display device according to the first embodiment.

FIG. 2 is a schematic perspective view illustrating the display device according to the first embodiment.

Figure 3:
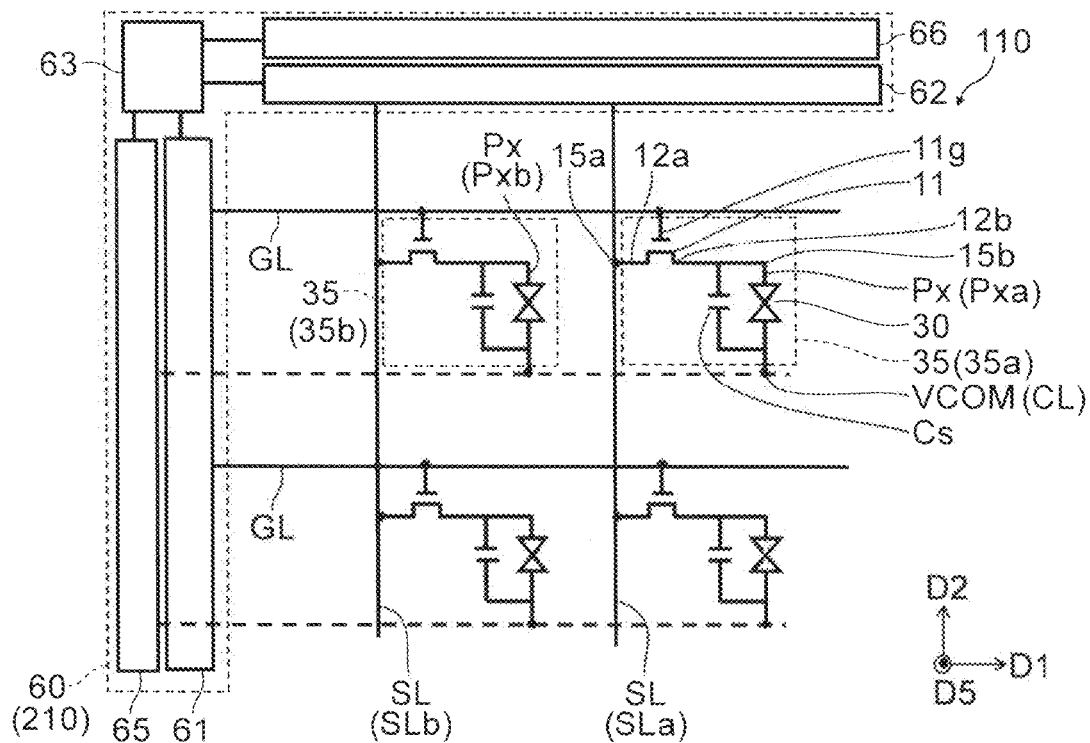
FIG. 3 is a schematic view illustrating the display device according to the first embodiment.

FIG. 3 is a schematic view illustrating the display device according to the first embodiment.

As shown in FIG. 2, the multiple gate lines GL (the multiple first interconnects L1), the multiple signal lines SL (the multiple second interconnects L2), the multiple common lines CL (the multiple third interconnects L3), and the multiple sense lines RL (the multiple fourth interconnects L4) are provided in the display device 110 according to the embodiment. The multiple switch elements 11, the multiple pixel electrodes Px, and the first insulating layer I1 illustrated in FIG. 1 are provided in the display device 110. These components are not shown in FIG. 2.

As shown in FIG. 2, each of the multiple gate lines GL extends in a first direction D1. The multiple gate lines GL are arranged in a second direction D2. The second direction D2 intersects the first direction D1.

For example, the first direction D1 is the X-axis direction. The second direction D2 is, for example, the Y-axis direction.

The multiple gate lines GL include, for example, a first gate line GL1, a second gate line GL2, and an nth gate line GLn. The number of the gate lines GL is n. n is an integer not less than 2. For example, n is 1920. In the embodiment, n is arbitrary.

Each of the multiple signal lines SL extends in the second direction D2. The multiple signal lines SL are arranged in the first direction D1.

The multiple signal lines SL include, for example, a first signal line SL1, a second signal line SL2, and an mth signal line SLm. The number of the signal lines SL is m. m is an integer not less than 2. For example, m is 1080×3. In other words, in the case where, for example, a set of a red pixel, a green pixel, and a blue pixel is used to form one component, the number of components is 1080. In the embodiment, m is arbitrary.

As shown in FIG. 3, each of the multiple switch elements 11 is electrically connected to one selected from the multiple gate lines GL and one selected from the multiple signal lines SL. In other words, the gate 11g of the switch element 11 is connected to one of the multiple gate lines GL. The first portion 12a of the semiconductor layer 12 of the switch element 11 is connected to one of the multiple signal lines SL via the first connection portion 15a.

As shown in FIG. 3, the multiple pixel electrodes Px are electrically connected respectively to the multiple switch elements 11. One pixel electrode Px is electrically connected to the second portion 12b of the semiconductor layer 12 of the switch element 11 via the second connection portion 15b.

As shown in FIG. 3, the display layer 30 (e.g., the liquid crystal layer) is disposed between the common lines CL and the pixel electrodes Px. The display layer 30 is a load capacitance. The common lines CL are set to a VCOM potential. In the example, a storage capacitor Cs is provided in parallel with the display layer 30. The storage capacitor Cs may be provided as necessary and may be omitted.

As shown in FIG. 2, each of the multiple common lines CL extends in a third direction D3. The third direction D3 is parallel to the X-Y plane. The X-Y plane includes the first direction D1 and the second direction D2. A fourth direction D4 is parallel to the X-Y plane and intersects the third direction D3. In the example, the third direction D3 is parallel to the first direction D1; and the fourth direction D4 is parallel to the second direction D2.

The multiple common lines CL include, for example, a first common line CL1, a second common line CL2, and an Nth common line CLN. The number of the common lines CL is N. N is an integer not less than 2. For example, N is 27. In the embodiment, N is arbitrary.

The multiple sense lines RL are separated from the gate lines GL, the signal lines SL, the common lines CL, the switch elements 11, and the multiple pixel electrodes Px in a fifth direction D5. The fifth direction D5 is perpendicular to the X-Y plane.

The multiple sense lines RL include, for example, a first sense line RL1, a second sense line RL2, and an Mth sense line RLM. The number of the sense lines RL is M. M is an integer not less than 2.

In FIG. 2, the signal lines SL and the common lines CL are disposed between the gate lines GL and the sense lines RL. In the embodiment, the disposition (the disposition in the fifth direction D5) of these lines may have various modifications.

The optical operation of the display layer 30 (e.g., the liquid crystal layer) of the multiple pixels 35 is controlled by the gate lines GL, the signal lines SL, the switch elements 11, and the pixel electrodes Px. Thereby, the display is performed. In the display operation, the common lines CL are utilized as the opposing electrode of the pixel electrodes Px. In other words, the potential of each of the multiple pixel electrodes Px is controlled by supplying electrical signals to the pixel electrodes Px via the switch elements 11. The alignment of the liquid crystal is changed by the electric field generated by the pixel electrodes Px and the common lines CL; and the display is performed.

On the other hand, touch input to the upper surface Uf of the display device 110 is sensed by the multiple sense lines RL and the multiple common lines CL. In the sense operation, for example, an input member (e.g., an input pen, etc.), a finger of a viewer (a user) of the display device 110, etc., is in contact with or proximal to the upper surface Uf of the display device 110. The electrical capacitance that is formed by the sense lines RL and the common lines CL changes due to the contact or proximity recited above. The touch input is sensed by sensing the change of the electrical capacitance. For example, electrostatic-capacitance type sensing is performed. The display device 110 is a display device that has, for example, an input function.

In the example, the common lines CL (the third interconnects L3) are used as an opposing electrode Tx for the sensing while being used as the opposing electrode for the display. In the embodiment, the sensing may be performed using the third interconnects L3 (the opposing electrode Tx) and the fourth interconnects L4 (the sense lines RL); and the opposing electrodes for the display may be provided separately from the third interconnects L3.

As shown in FIG. 2, the number of the gate lines GL (i.e., n) is larger than the number of the common lines CL (i.e., N). A high definition display can be implemented by the number of the gate lines GL being large. On the other hand, there are many cases where the resolution of the input may be lower than the resolution of the display. Therefore, the number of the common lines CL can be set to be smaller than the number of the gate lines GL. By setting the number of the common lines CL to be smaller, the time necessary for the sense operation can be short; and a display having little (or no) incongruity is possible.

For example, the multiple gate lines GL are divided into multiple groups. For example, the multiple gate lines GL include a first group GLg1, a second group GLg2, a kth group GLgk, etc. Each of the multiple groups includes mutually-adjacent multiple gate lines GL. For example, the number of the gate lines GL included in one group is, for example, j. j is an integer not less than 2.

For example, the common lines CL (e.g., each of the multiple common lines CL) respectively overlap the multiple groups of the gate lines GL when projected onto the X-Y plane.

A control unit 60 is provided in the display device 110 as illustrated in FIG. 3. At least a portion of the control unit 60 may be provided in the first substrate unit 10u. At least a portion of the control unit 60 may be included in a drive device 210 of the display device. At least a portion of the drive device 210 may be included in the control unit 60.

For example, the control unit 60 includes a gate line driver 61, a signal line driver 62, and a control circuit 63. The gate line driver 61 is electrically connected to the multiple gate lines GL. The signal line driver 62 is electrically connected to the multiple signal lines SL. In such a case, as described below, a selector unit may be provided between the signal line driver 62 and the multiple signal lines SL. The control circuit 63 is electrically connected to the gate line driver 61 and the signal line driver 62. The appropriate signal processing is performed for electrical signals (including image signals) acquired by the control circuit 63. The electrical signals for which the signal processing is performed are supplied to the gate line driver 61 and the signal line driver 62.

For example, a common line driver 65 and a sense circuit 66 may be further provided in the control unit 60. The common line driver 65 is electrically connected to the common lines CL and controls the potential of the common lines CL. For example, "common inversion driving," etc., may be implemented. The sense circuit 66 is electrically connected to the sense lines RL (not-shown in FIG. 3). In the sense operation, the capacitance formed between each of the multiple common lines CL and each of the multiple sense lines RL is sensed by the common line driver 65 and the sense circuit 66.

As illustrated in FIG. 3, the multiple pixels 35 include a first color pixel 35*a* and a second color pixel 35*b*. For example, the multiple pixel electrodes Px include a first color pixel electrode Pxa for the first color and a second color pixel electrode Pxb for the second color. The second color is different from the first color. The multiple signal lines SL include a first color interconnect SLa and a second color interconnect SLb. The first color interconnect SLa is electrically connected to the first color pixel electrode Pxa via one selected from the multiple switch elements 11. The second color interconnect SLb is electrically connected to the second color pixel electrode Pxb via one other selected from the multiple switch elements 11. Further, a third color pixel and a third pixel electrode may be provided. Accordingly, a third color interconnect may be provided. Pixels 35 having four or more colors may be provided. An example of the case where pixels 35 of three colors are provided will now be described.

Figure 4:
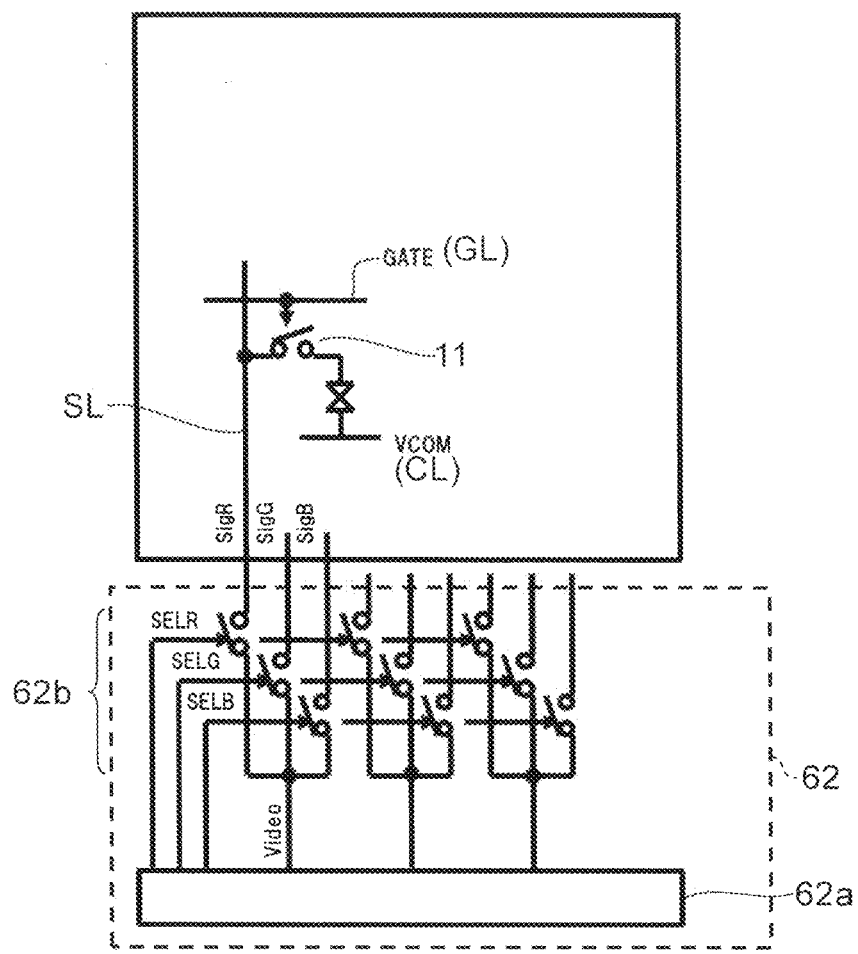
FIG. 4 is a schematic view illustrating the display device according to the first embodiment.

FIG. 4 is a schematic view illustrating the display device according to the first embodiment.

FIG. 4 shows an example of the signal line driver 62 of the control unit 60.

In the example as shown in FIG. 4, a signal line circuit unit 62*a* and a selector unit 62*b* are provided in the signal line driver 62. The signal line circuit unit 62*a* is electrically connected to the multiple signal lines SL via the selector unit 62*b*.

The selector unit 62*b* includes, for example, an R color selector SELR, a G color selector SELG, and a B color selector SELB. For example, the R color is red; the G color is green; and the B color is blue. The signal line of the multiple signal lines SL corresponding to the R color is connected to the R color selector SELR. The signal line of the multiple signal lines SL corresponding to the G color is connected to the G color selector SELG. The signal line of the multiple signal lines SL corresponding to the B color is connected to the B color selector SELB.

An image signal Video is output from the signal line circuit unit 62*a*. The image signal Video includes signals relating to the multiple colors (e.g., red, green, blue, etc.). By the selecting operation of the selector unit 62*b*, the signals (a red signal SigR, a green signal SigG, a blue signal SigB, etc.) relating to the multiple colors are supplied to the signal lines SL corresponding to each color.

Figure 5:
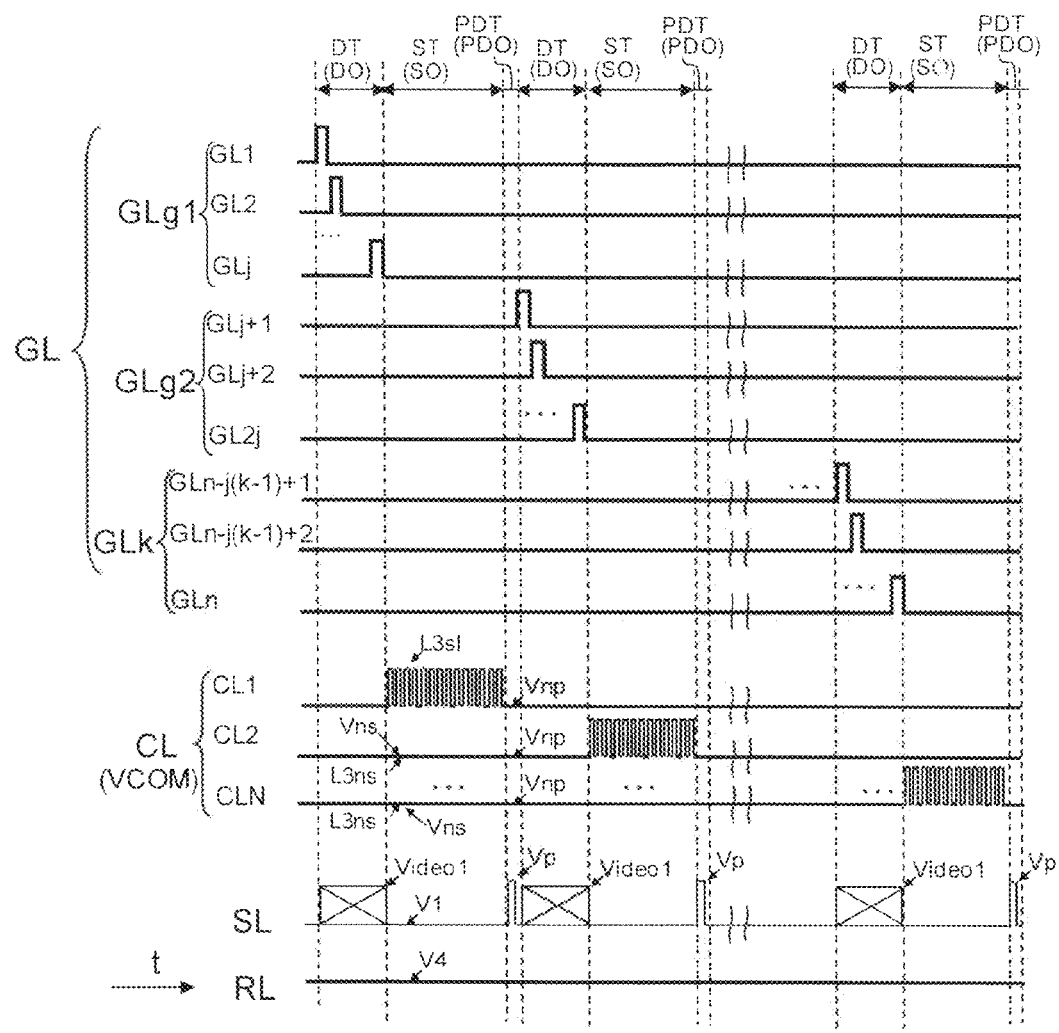
FIG. 5 is a schematic view illustrating operations of the display device according to the first embodiment.

FIG. 5 is a schematic view illustrating operations of the display device according to the first embodiment.

FIG. 5 is a time chart illustrating display operations and sense operations of the display device 110.

In FIG. 5, the horizontal axis is the time t. FIG. 5 shows examples of the potentials of the gate lines GL, the common lines CL, the signal lines SL, and the sense lines RL. In FIG. 5, high potentials are positioned higher than low potentials. FIG. 5 illustrates one frame interval.

Multiple display intervals DT are provided as shown in FIG. 5. A display operation DO is performed in the display interval DT. In the display operation DO, the display is performed by signals supplied to the gate lines GL and the signal supplied to the signal lines SL. A sensing interval ST is provided between two display intervals DT. A sense operation SO is performed in the sensing interval ST. In the sense operation SO, sensing is performed using the common lines CL and the sense lines RL. In the embodiment, a pre-display interval PDT is provided. The pre-display interval PDT is positioned after one sensing interval ST and prior to one display interval DT. A pre-display operation PDO is performed in the pre-display interval PDT.

First, an example of the display operation DO will be described.

For example, in one display interval DT, the gate lines GL (e.g., the first gate line GL1, the second gate line GL2, the jth gate line GLj, etc.) that are included in the first group GLg1 are sequentially selected; and a scanning pulse (a scanning signal) is sequentially supplied to the gate lines GL. On the other hand, a signal Video1 that corresponds to the image signal Video is supplied to the signal lines SL. The signal Video1 that corresponds to the image signal Video is supplied to the pixel electrodes Px by the operation of the switch elements 11 according to the scanning pulses. Thereby, the display is performed for the pixels 35 corresponding to the first group GLg1.

In the next display interval DT, the gate lines GL (e.g., the (j+1)th gate line GLj+1, the (j+2)th gate line GLj+2, the 2jth gate line GL2j, etc.) that are included in the second group GLg2 are sequentially selected; and a scanning pulse (a scanning signal) is sequentially supplied to the gate lines GL. On the other hand, the signal Video1 that corresponds to the image signal Video is supplied to the signal lines SL. Thereby, the display is performed for the pixels 35 corresponding to the second group GLg2.

Similarly, the gate lines GL (e.g., the (n−j(k−1)+1)th gate line GLn−j(k−1)+1, the (n−j(k−1)+2)th gate line GLn−j(k−1)+2, and the nth gate line GLn, etc.) that are included in the kth group GLgk are sequentially selected; and a scanning pulse (a scanning signal) is sequentially supplied to the gate lines GL. On the other hand, the signal Video1 that corresponds to the image signal Video is supplied to the signal lines SL. Thereby, the display is performed for the pixels 35 corresponding to the kth group GLgk.

Thus, the scanning of the first to nth gate lines GL1 to GLn is performed; and the display of one frame is performed.

A display of multiple frames is performed by repeatedly performing the operations recited above. The potential of the pixel electrode Px corresponding to each of the gate lines GL is substantially maintained during one frame. The storage capacitor Cs described above makes it easy to maintain the potential of the pixel electrode Px.

An example of the sense operation SO will now be described.

In the example, the sense operation SO is performed between the display operation DO relating to the first group GLg1 and the display operation DO relating to the second group GLg2. In one sense operation SO, for example, one selected from the multiple third interconnects L3 is selected. In the one sense operation SO, each of the multiple third interconnects L3 (e.g., all of the third interconnects L3) may be sequentially selected. The case will now be described where one of the third interconnects L3 (e.g., the first common line CL1) is selected in one sense operation SO; one other of the third interconnects L3 (e.g., the second common line CL2) is selected in one other sense operation SO; and similarly, the Nth common line CLN is sequentially selected.

The common line CL that is selected is called the "selected third interconnect L3*sl*". The common lines CL other than the selected third interconnect L3*sl* are called the "unselected third interconnects L3*ns*". For example, a high frequency signal is applied to the selected third interconnect L3. The high frequency signal is, for example, a high frequency signal in which 0 V and 5 V are repeated. The frequency of the high frequency signal is not less than about 100 kHz and not more than about 500 kHz, e.g., about 300 kHz. The unselected third interconnects L3ns are set to, for example, an unselect potential Vns (e.g., 0 V, etc.).

In the sense operation SO, the multiple signal lines SL (the second interconnects L2) are set to a first potential V1. The first potential V1 is, for example, 0 V. The first potential V1 may have multiple values and may change temporally. For example, in the case where inversion driving is used, etc., the first potential V1 may change by frame, by row, by column, by pixel group, and/or by pixel.

The sense operation SO is performed by sensing the current signals flowing between the selected third interconnect L3sl and each of the multiple sense lines RL. For example, in the sense operation SO, the sense lines RL are set to a fourth potential V4 (e.g., the ground potential of 0 V). Then, the current that flows between the sense lines RL and the selected third interconnect L3sl provided with the high frequency signal is sensed.

In the embodiment, the pre-display operation PDO is performed between one sense operation SO and one display operation DO. In the pre-display operation PDO, the potential of the common lines CL is set to a pre-display potential Vnp. On the other hand, in the pre-display operation PDO, a prescribed voltage Vp is applied to the signal lines SL. The application of the voltage Vp can cause the potential of the signal lines SL to approach the potential of the display operation DO prior to the display operation DO. The application of the voltage Vp may be multiply implemented. The voltage Vp may be changed between multiple applications.

In the case of a reference example in which the display operation DO is performed directly after the sense operation SO without performing the pre-display operation PDO, it was found that the display easily becomes nonuniform. For example, in the sense operation SO, the signal lines SL are set to the prescribed first potential V1 (e.g., 0 V, etc.). In the display operation DO directly after the sense operation SO, when the signal lines SL are to be set to the potential of the signal Video1, the change of the potential of the signal lines SL is delayed. Due to the delay, the potential of the signal lines SL is no longer the desired potential; and the display becomes nonuniform. For example, it was found that there are cases where stripes along the extension direction of the gate lines GL are observed. The boundaries of the stripes occur easily at, for example, the boundaries between the groups of the gate lines GL.

For example, there are cases where the dielectric dispersion in the first insulating layer I1 disposed between the signal lines SL and the common lines CL is large. For example, in the case where an organic material is used as the first insulating layer I1, not only the electric polarization but also polarization due to dipoles occurs easily in the first insulating layer I1. For example, in the case where the organic material is an acrylic material or a polyimide material, dipoles based on functional groups occur. Therefore, in the first insulating layer I1, the dielectric dispersion becomes large; and there is a tendency for the relaxation to become large.

Figure 6:
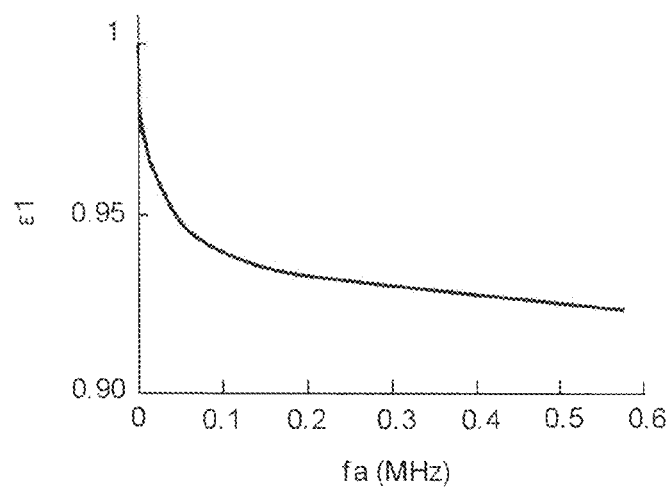
FIG. 6 is a graph illustrating a characteristic of the display device according to the first embodiment.

FIG. 6 is a graph illustrating a characteristic of the display device according to the first embodiment.

Figure 7:
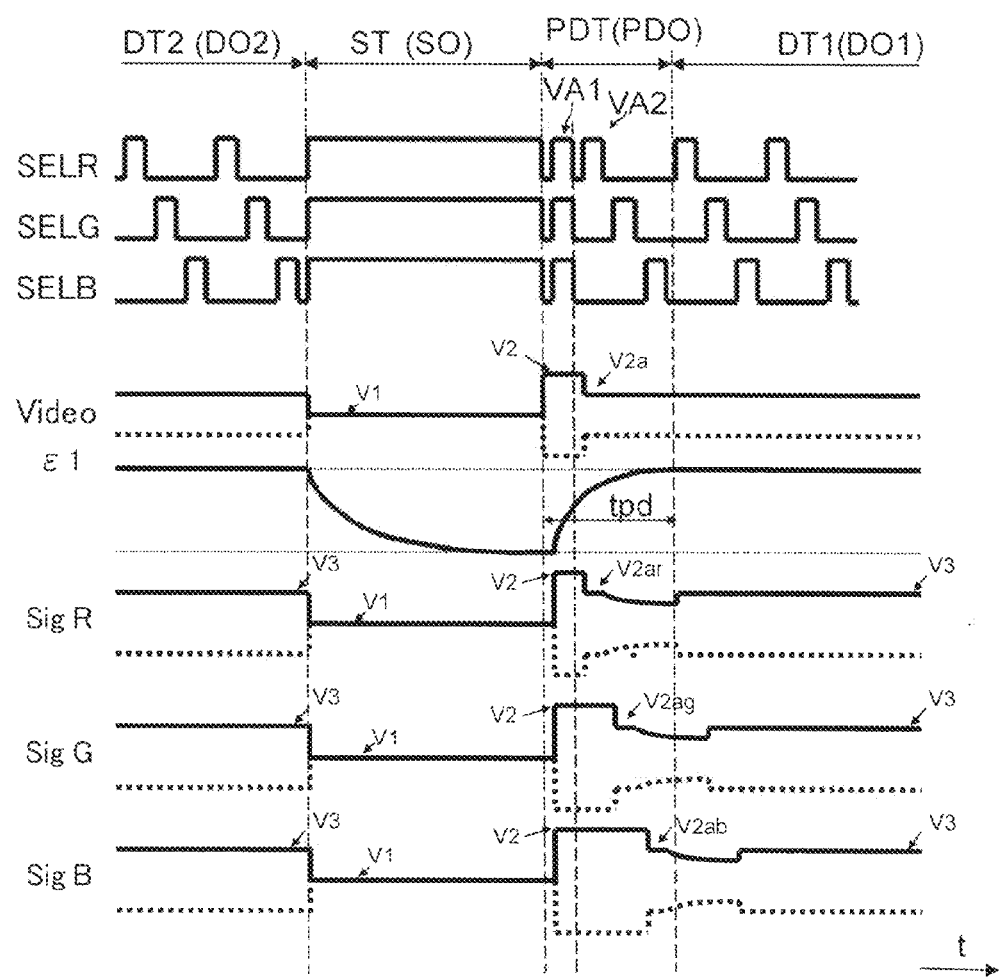
FIG. 7 is a schematic view illustrating operations of the display device according to the first embodiment.

FIG. 6 illustrates the characteristic of the dielectric dispersion of the material of the first insulating layer I1. In FIG. 7, the horizontal axis is a frequency fa of the voltage applied to the material. The vertical axis is a relative dielectric constant $\in 1$ of the material. The relative dielectric constant $\in 1$ is a normalized value for which the dielectric constant of the material is 1 when a direct-current voltage is applied (corresponding to the frequency fa being 0 Hz). The example is the case where the material of the first insulating layer I1 is an organic material (an acrylic resin).

As shown in FIG. 6, the dielectric constant $\in 1$ decreases as the frequency fa increases. For example, the dielectric constant when the frequency fa is 300 kHz is about 0.93 times the dielectric constant for direct current. Thus, a relatively large dielectric dispersion is observed. Thus, dielectric relaxation occurs in the first insulating layer I1. There are cases where the relaxation time of the dielectric constant (the relative dielectric constant) in the first insulating layer I1 is long.

For example, in the case where the relaxation time of the first insulating layer I1 is long, the change of the potential difference between the signal lines SL and the common lines CL is delayed. Thereby, it is considered that the uniformity of the display degrades.

In the embodiment, the pre-display operation PDO is performed prior to performing the display operation DO. The prescribed voltage Vp is applied to the signal lines SL in the pre-display operation PDO. In other words, the potential of the signal lines SL is pre-changed prior to the display operation DO. Thereby, for example, the potential of the signal lines SL approaches the potential of the display operation DO beforehand. As a result, the display can be uniform. It is considered that the increase of the uniformity of the display due to the pre-display operation is particularly effective in the case where the dielectric dispersion of the first insulating layer I1 is relatively large. Even in the case where the dielectric dispersion of the first insulating layer I1 is small, the uniformity of the display can be increased further by performing the pre-display operation recited above.

The display operation DO, the sense operation SO, and the pre-display operation PDO recited above are implemented by the control unit 60.

FIG. 7 is a schematic view illustrating operations of the display device according to the first embodiment.

FIG. 7 shows an example of the operations of the display device 110. FIG. 7 shows the example of two display operations (a first display operation DO1 and a second display operation DO2), the sense operation SO between the two display operations, and the pre-display operation PDO between the sense operation SO and the first display operation DO1.

FIG. 7 illustrates the potentials of the R color selector SELR, the G color selector SELG, and the B color selector SELB of the selector unit 62b, the image signal Video (the signal Video1), and the potentials of the signals (the red signal SigR, the green signal SigG, and the blue signal SigB) relating to the multiple colors.

FIG. 7 illustrates a model-like illustration of the relative dielectric constant $\in 1$ of the capacitors formed between the signal lines SL and the common lines CL. In FIG. 7, the dielectric constant $\in 1$ is a model-like illustration of the temporal delay of the change of the capacitance including the first insulating layer I1 formed between the signal lines SL and the common lines CL. In other words, the temporal change of the dielectric constant $\in 1$ corresponds to the delay of the change of the capacitance.

In the example, the sensing interval ST is provided prior to a first display interval DT1. A second display interval DT2 is provided prior to the sensing interval ST. The pre-display interval PDT is provided between the sensing interval ST and the first display interval DT1.

The second display operation DO2 of the second display interval DT2 corresponds to, for example, the display using the gate lines GL of the (i−1)th group GLg(i−1). The first display operation DO1 of the first display interval DT1 corresponds to, for example, the display using the gate lines GL of the ith group GLgi. For example, the second display operation DO2 corresponds to the display using the gate lines GL of the first group GLg1. The first display operation DO1 corresponds to the display using the gate lines GL of the second group GLg2.

In the second display operation DO2 of the second display interval DT2, the image signal Video that corresponds to the content to be displayed is output from the signal line circuit unit 62a (referring to FIG. 4). On the other hand, the selection pulse is sequentially supplied to the R color selector SELR, the G color selector SELG, and the B color selector SELB. Thereby, the red signal SigR, the green signal SigG, and the blue signal SigB are supplied to the signal lines SL. Thereby, the second display operation DO2 is performed.

The sense operation SO is implemented in the sensing interval ST. In the sense operation SO, the R color selector SELR, the G color selector SELG, and the B color selector SELB are set to, for example, the selected state (the high level). At least one of the multiple signal lines SL (the second interconnects L2) is set to the first potential V1 (e.g., 0 V). An electrical characteristic between the multiple sense lines RL (the fourth interconnects L4) and the selected third interconnect L3sl of the multiple common lines CL (the third interconnects L3) is sensed. As described in regard to FIG. 5, the selected third interconnect L3sl is one selected from the multiple common lines CL (the third interconnects L3) and is in the selected state. For example, a touch input is sensed by the sense operation SO of the sensing interval ST.

The sensing of the electrical characteristic includes sensing, for example, the current flowing between the selected third interconnect L3sl and the multiple sense lines RL (the fourth interconnects L4). The sensing of the electrical characteristic includes sensing, for example, the impedance between the selected third interconnect L3sl and the multiple sense lines RL (the fourth interconnects L4). The sensing of the electrical characteristic may include determining the difference between a sensing result that is implemented previously and a sensing result that is sensed newly.

The pre-display operation PDO is performed in the pre-display interval PDT after the sensing interval ST and prior to the first display interval DT1. The pre-display operation PDO includes a first voltage application operation VA1. In the example, the pre-display operation PDO further includes a second voltage application operation VA2. In the first voltage application operation VA1, at least one of the multiple signal lines SL (the second interconnects L2) recited above is set to a second potential V2. The second potential V2 is the pre-display potential. The second potential V2 is different from the first potential V1. In the second voltage application operation VA2, at least one of the multiple signal lines SL (the second interconnects L2) recited above is set to a potential V2a (potentials V2ar, V2ag, V2ab, etc.).

For example, the setting of the second potential V2 corresponds to the application of the voltage Vp to the signal lines SL described in regard to FIG. 5. In the example, the application of the voltage Vp to the signal lines SL further includes the setting of the potential V2a.

The first display operation DO1 is implemented in the first display interval DT1. In the first display operation DO1, the display layer 30 is caused to perform the optical operation by controlling the potentials of the multiple pixel electrodes Px by supplying the first scanning signal to at least one selected from the multiple gate lines GL (the first interconnects L1) and supplying the first display signal to the multiple signal lines SL (the second interconnects L2). In the first display operation DO1, the multiple signal lines SL (the second interconnects L2) are set to the display potential (e.g., a third potential V3).

For example, in the first display operation DO1, the image signal Video is output from the signal line circuit unit 62a; and the selection pulse is sequentially supplied to the R color selector SELR, the G color selector SELG, and the B color selector SELB. Thereby, the red signal SigR, the green signal SigG, and the blue signal SigB are supplied to the signal lines SL. Thereby, the first display operation DO1 is performed.

In the embodiment, the potential of the signal lines SL is changed prior to the first display operation DO1 by the first voltage application operation VA1 of the pre-display operation PDO. For example, the potential of the signal lines SL approaches the potential of the first display operation DO1 beforehand. Thereby, the display can be uniform. Further, the potential of the signal lines SL is pre-changed prior to the first display operation DO1 by the second voltage application operation VA2. For example, the potential of the signal lines SL approaches the potential of the first display operation DO1. Thereby, the display can be more uniform.

In the embodiment, for example, the second potential V2 is higher than the first potential V1. For example, the first potential V1 is 0 V. The second potential V2 is, for example, about +4 V. The second potential V2 may be about −4 V. For example, the maximum value of the signal voltage used in the display (the maximum value of the absolute value of the display potential) may be used as the second potential V2 (the absolute value of the voltage). For example, in the pre-display operation PDO, a voltage that is higher than that of the sense operation SO is applied to the signal lines SL. The absolute value of the pre-display potential (the second potential V2) is greater than the absolute value of the display potential (the third potential V3). In the case where the potentials are positive, the pre-display potential is higher than the display potential.

For example, in the sense operation SO, the unselected third interconnects L3ns (the interconnects other than the selected third interconnect L3sl of the multiple common lines CL) are set to the unselect potential Vns. In the embodiment, the absolute value of the potential difference between the second potential V2 and the potential (the pre-display potential Vnp) of the first voltage application operation VA1 of the unselected third interconnects L3ns is |V2−Vnp|. On the other hand, the absolute value of the potential difference between the first potential V1 and the potential (the unselect potential Vns) of the sensing interval ST of the unselected third interconnects L3ns is |V1−Vns|. The absolute value |V2−Vnp| is set to be greater than the absolute value |V1−Vns|.

For example, the unselect potential Vns, the pre-display potential Vnp, and the first potential V1 are 0 V. On the other hand, the second potential V2 is +4 V. In other words, the absolute value of the potential difference between the signal lines SL and the common lines CL of the pre-display operation PDO is set to be greater than the absolute value of the potential difference between the unselected third interconnects L3ns (a portion of the common lines CL) and the signal lines SL of the sense operation SO. The signal lines SL can be caused beforehand to approach the potential of the first display operation DO1 that is performed after the pre-display operation PDO; and the effects due to dielectric relaxation can be suppressed. The values of the voltages recited above are examples; and various modifications of the values of the voltages in the embodiment are possible.

In the embodiment, the time tpd of the pre-display interval PDT is, for example, not less than 1 μs and not more than 10 μs, e.g., not less than 3 μs and not more than 7 The time tpd is about 5 μs.

In the embodiment, in the case where the second voltage application operation VA2 is implemented in addition to the first voltage application operation VA1, the potential V2a (the potentials V2ar, V2ag, V2ab, etc.) of the second voltage application operation VA2 may be different from the potential (the second potential V2) of the first voltage application operation VA1.

In the embodiment, for example, the potential V2a of the second voltage application operation VA2 may be changed according to the potential of the signal lines SL of the end of the second display interval DT2.

In other words, as illustrated in FIG. 7, the second display operation DO2 is performed not only in the first display operation DO1 but also in the second display interval DT2 prior to the sensing interval ST. In the second display operation DO2, the second scanning signal is supplied to at least one selected from the multiple gate lines GL (the first interconnects L1); and the second display signal is supplied to the multiple signal lines SL (the second interconnects L2). In the second display operation DO2, the multiple signal lines SL (the second interconnects L2) are set to the display potential (e.g., the third potential V3). Then, in the second voltage application operation VA2 of the pre-display operation PDO, at least one of the multiple signal lines SL is set to the third potential V3 (the final potential) of the multiple signal lines SL of the end of the second display interval DT2. In other words, in the second voltage application operation VA2, the signal lines SL are set to the potential of the "last 1H" of the second display interval DT2. Subsequently, the first display operation DO1 is performed.

In the embodiment, for example, the gate lines GL for which the second display operation DO2 is implemented are adjacent to the gate lines GL for which the first display operation DO1 is implemented. The display is caused to be more uniform by setting the signal lines SL to the potential of the "last 1H" in the pre-display operation PDO.

For example, the second potential V2 that is set in the first voltage application operation VA1 may be set to be higher than the potential V2a of the second voltage application operation VA2.

For example, the potential of the first voltage application operation VA1 of the unselected third interconnects L3ns (the interconnects of the multiple common lines CL other than the selected third interconnect L3sl) is, for example, the pre-display potential Vnp. The absolute value of the potential difference between the pre-display potential Vnp and the second potential V2 is |V2−Vnp|. On the other hand, the potential difference between the pre-display potential Vnp and the third potential V3 recited above is |V3−Vnp|. In the embodiment, |V2−Vnp| is larger than |V3−Vnp|.

In the embodiment, the potential V2a (the potentials V2ar, V2ag, V2ab, etc.) of the second voltage application operation VA2 changes according to, for example, the third potential V3 (the potential of the "last 1H"). On the other hand, the second potential V2 may be fixed or may change in conjunction with the third potential V3. For example, the second potential V2 (the pre-display potential) may change proportionally to the third potential V3 (the final potential). For example, the ratio of the second potential V2 to the third potential V3 may be, for example, not less than 1 and not more than 2.

As described above, the second display operation DO2 is implemented, for example, for the gate lines GL of the (i−1)th group GLg(i−1) (e.g., the first group GLg1); and the first display operation DO1 is implemented for the gate lines GL of the ith group GLgi (e.g., the second group GLg2). In such a case, the display easily becomes nonuniform. In such a case, the display can be effectively caused to be uniform by performing the pre-display operation PDO recited above.

In other words, the third direction D3 is parallel to the first direction D1. The multiple gate lines GL are divided into multiple groups; and each of the multiple groups includes mutually-adjacent multiple gate lines GL. The multiple common lines CL respectively overlap the multiple groups when projected onto the X-Y plane. In such a case, the control unit 60 performs, in the second display interval DT2, the second display operation DO2 of supplying the second scanning signal to the gate lines GL of the multiple gate lines GL included in the first group GLg1 and supplying the second display signal to the multiple signal lines SL. The first display operation DO1 includes, in the first display interval DT1, supplying the first scanning signal to the gate lines GL included in the second group GLg2 adjacent to the first group GLg1 and supplying the first display signal to the multiple signal lines SL. At this time, the display can be effectively caused to be uniform by implementing the sense operation SO and the pre-display operation PDO recited above.

The first display signal of the first display operation DO1 is the same as the second display signal of the second display operation DO2. In other words, the display potential of the first display operation DO1 is the same as the display potential of the second display operation DO2. The image of the first display operation DO1 is the same as the image of the second display operation DO2. The sensing is performed between two intervals (the first display interval DT1 and the second display interval DT2) that display the same display content. After the second display operation DO2, the sensing is performed; and subsequently, the first display operation DO1 of the same image is performed. At this time, the response (the restoration) of the image display of the first display operation DO1 is faster because the pre-display operation PDO is performed between the sensing and the first display operation DO1. Thereby, unevenness of the display is suppressed.

More specifically, in a display device in which the touch sensing interval for sensing the contact or proximity of an object is provided separately from the display interval for performing the image display of the display, there are cases where lines and/or unevenness occur in the image display before and after the touch sensing interval; and therefore, the same image may be displayed before and after the touch sensing interval; but in the case where the potentials of the signal lines of the touch sensing interval are set to be relatively low potentials, the restoration of the image after the touch sensing interval is delayed; the display unevenness may not be improved; and therefore, such a display unevenness can be improved by performing operations such as those recited above.

In the embodiment, the first voltage application operation VA1 may be implemented simultaneously for multiple signal lines SL corresponding to the mutually-different colors. For example, the first color pixel electrode Pxa and the second color pixel electrode Pxb are provided in the multiple pixel electrodes Px; and the first color interconnect SLa and the second color interconnect SLb are included in the multiple signal lines SL (referring to FIG. 4). In such a case, as illustrated in FIG. 7, the control unit 60 may perform the first voltage application operation VA1 simultaneously for the first color interconnect SLa and the second color interconnect SLb.

In the embodiment, the first voltage application operation VA1 may be sequentially implemented for multiple signal lines SL corresponding to mutually-different colors. For example, the control unit 60 performs the first voltage application operation VA1 for the first color interconnect SLa in the first interval and performs the first voltage application operation VA1 for the second color interconnect in the second interval after the first interval. For example, in the example shown in FIG. 7, the second voltage application operation VA2 is sequentially implemented for the multiple signal lines SL corresponding to the different colors. The second voltage application operation VA2 may be considered to be the first voltage application operation VA1.

In the embodiment, the selector unit 62b recited above may be provided as necessary and may be omitted. The three systems of selectors of the R color selector SELR, the G color selector SELG, and the B color selector SELB correspond to three colors in the example recited above. The selectors may have two systems, four systems, or more.

In the example recited above, a liquid crystal layer is used as the display layer 30; and a lateral electric field mode configuration is applied. In other words, as illustrated in FIG. 1, at least a portion of the multiple common lines CL is disposed between at least a portion of one selected from the multiple pixel electrodes Px and at least a portion of one selected from the multiple signal lines SL. The second insulating layer I2 is disposed between the at least a portion of the multiple common lines CL recited above and the at least a portion of the one selected from the multiple pixel electrodes Px recited above. Each of the multiple pixel electrodes Px includes the multiple portions Pxs separated from each other in the X-Y plane. The display layer 30 includes a liquid crystal; and the optical operation includes a change of an optical characteristic. The alignment of the liquid crystal of the display layer 30 changes in the X-Y plane. For example, the alignment of the liquid crystal changes according to an electric field that is generated by the at least a portion of the multiple common lines CL recited above and the multiple portions Pxs of the pixel electrodes Px recited above and has a component parallel to the X-Y plane.

For example, a FFS (fringe field switching) mode liquid crystal may be used as, for example, the display layer 30. For example, an IPS (in-plane switching) mode liquid crystal may be used as the display layer 30.

For example, in the case where the lateral electric field mode liquid crystal is used, the opposing electrode (in the example recited above, the common lines CL) of the pixel electrodes Px is provided in the first substrate unit 10u. In such a configuration, the opposing electrode may not be provided in the second substrate unit 20u. If the opposing electrode is provided in the second substrate unit 20u, there are cases where the sense operation is not easy to implement using the sense lines RL. The sense operation is made easier by providing the common lines CL that are used as the opposing electrode in the first substrate unit 10u.

Further, in the embodiment, the display layer 30 may include a light emitting layer.

Figure 8:
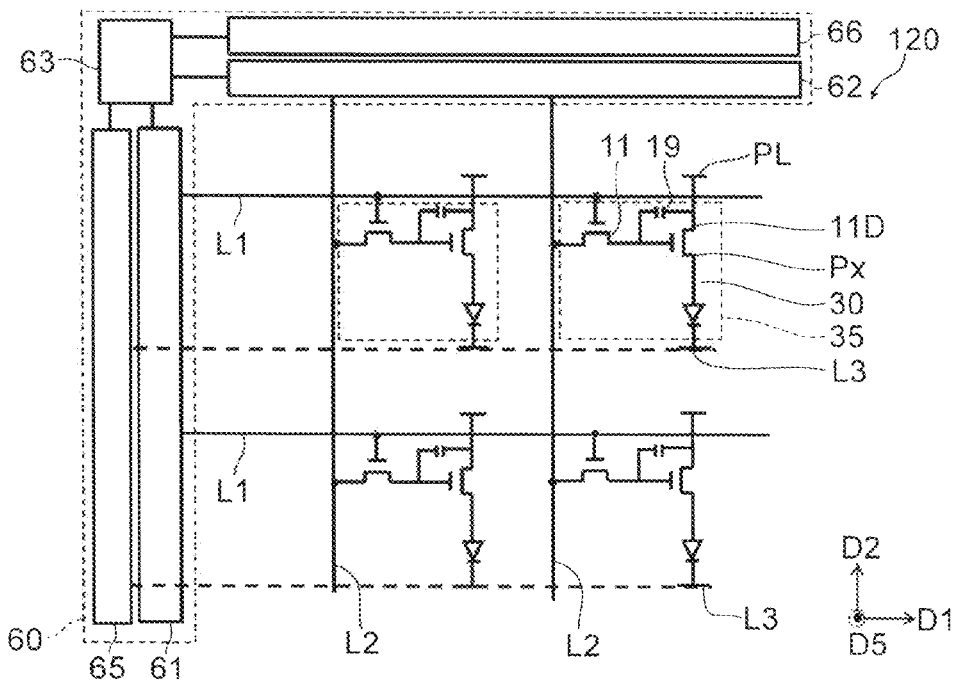
FIG. 8 is a schematic view illustrating another display device according to the first embodiment.

FIG. 8 is a schematic view illustrating another display device according to the first embodiment.

The fourth interconnects L4 (the sense lines RL) are not shown in FIG. 8.

In the display device 120 according to the embodiment, a light emitting layer (e.g., an organic light emitting layer) is used as the display layer 30. In the example as shown in FIG. 8, control lines are used as the first interconnects L1. Signal lines are used as the second interconnects L2. Opposing electrodes are used as the third interconnects L3 to oppose the pixel electrodes Px. Program transistors are used as the switch elements 11. Also, drive transistors 11D, power supply lines PL, and capacitors 19 are provided.

The program transistor (the switch element 11), the drive transistor 11D, the capacitor 19, and the pixel electrode Px are provided in one pixel 35.

For example, the second interconnect L2 is connected to the source of the program transistor. The first interconnect L1 is connected to the gate of the program transistor. The gate of the drive transistor 11D is connected to the drain of the program transistor. The drain of the drive transistor 11D is connected to the power supply line PL. The power supply line PL is set to, for example, a power supply potential Vdd. One end of the capacitor 19 is connected to the gate of the drive transistor 11D. The other end of the capacitor 19 is connected to the drain of the drive transistor 11D. The pixel electrode Px is connected to the source of the drive transistor 11D. The display layer 30 is provided between the pixel electrode Px and the opposing electrode (the third interconnect L3). In the case where an organic light emitting layer is used as the display layer 30, for example, the pixel electrode Px is used as the anode; and the opposing electrode is used as the cathode.

Signals are supplied sequentially to the first interconnects L1; the program transistors (the switch elements 11) and the drive transistors 11D operate; and charge corresponding to the signals supplied to the second interconnect L2 is supplied to the pixel electrodes Px. The charge is supplied to the pixel electrodes Px via the drive transistors 11D. For example, the display layer 30 emits light according to the charge (the potentials) of the pixel electrodes Px. Thereby, the display is performed.

In the display device 120 as well, the electrical characteristic between the third interconnect L3 and the fourth interconnect L4 is sensed in the sensing interval ST. Also, the pre-display operation PDO recited above is implemented in the pre-display interval PDT.

Thereby, a display device having high display uniformity can be provided.

Second Embodiment

The embodiment relates to a drive device 210 of the display device (referring to FIG. 3).

The display device according to the embodiment has, for example, an input function. The drive device 210 according to the embodiment implements at least a portion of the operations of the control unit 60 described in regard to the first embodiment.

Figure 9:
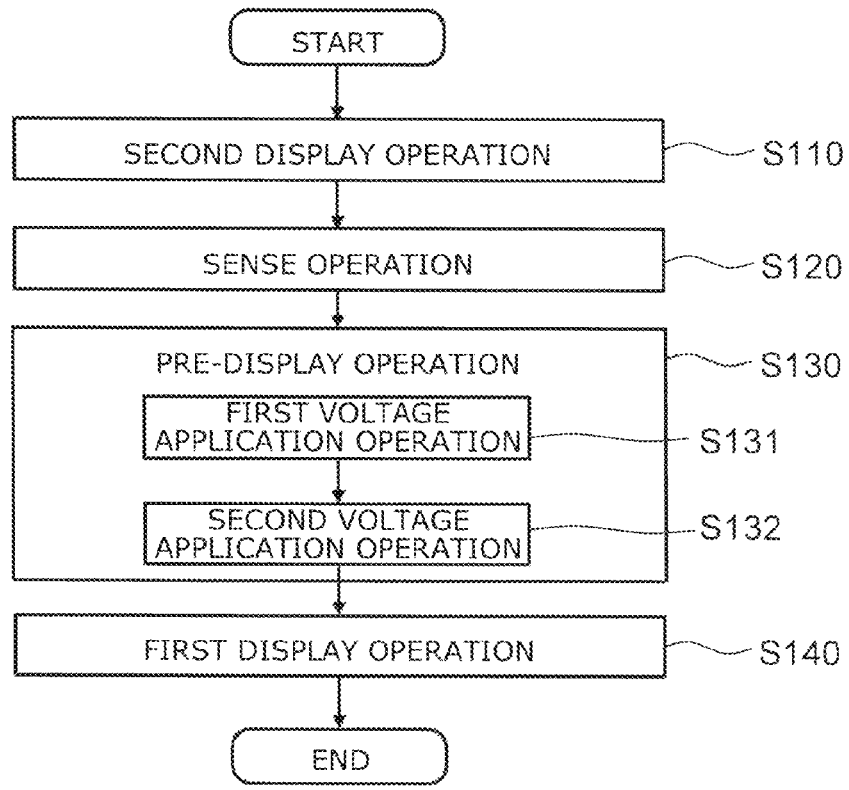
FIG. 9 is a flowchart illustrating the operations of the drive device of the display device according to the second embodiment.

FIG. 9 is a flowchart illustrating the operations of the drive device of the display device according to the second embodiment.

As shown in FIG. 9, for example, the drive device 210 implements the second display operation DO2 in the second display interval DT2 and implements the sense operation SO in the sensing interval ST (step S120), implements the first display operation DO1 in the first display interval DT1 (step S140), and implements the pre-display operation PDO in the pre-display interval PDT (step S130).

The electrical characteristic between the multiple fourth interconnects L4 and the selected third interconnect L3sl, which is one selected from multiple third interconnects L3 and is in the selected state, is sensed in the sense operation SO. In the sense operation SO, for example, at least one of the multiple second interconnects L2 is set to the first potential V1.

In the first display operation DO1, the display layer 30 is caused to perform the optical operation by controlling the potentials of the multiple pixel electrodes Px by supplying the first scanning signal to at least one selected from the multiple first interconnects L1 and supplying the first display signal to the multiple second interconnects L2. In the first display operation DO1, the multiple second interconnects L2 are set to the display potential (e.g., the third potential V3).

The first voltage application operation VA1 is implemented in the pre-display operation PDO (step S131). In the first voltage application operation VA1, for example, at least one of the multiple second interconnects L2 is set to the pre-display potential (the second potential V2) that is different from the first potential V1. The absolute value of the pre-display potential is greater than the absolute value of the display potential.

Further, the pre-display operation PDO may implement the second voltage application operation VA2 (step S132) described above. Further, the second display operation DO2 (step S110) may be implemented.

According to the embodiment, a drive device of a display device having high display uniformity can be provided. The embodiment may be implemented as a method for driving the display device.

According to the embodiment, a display device, a drive device of the display device, and a method for driving the display device having high display uniformity can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the interconnect, the switch element, the display layer, the insulating layer, the control unit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

Moreover, all display devices practicable by an appropriate design modification by one skilled in the art based on the display devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

For example, additions, deletions, or design modifications of components or additions, omissions, or condition modifications of processes appropriately made by one skilled in the art in regard to the embodiments described above are within the scope of the invention to the extent that the purport of the invention is included.

Moreover, other operations and effects produced by aspects described in the embodiment that are apparent from the specification or readily apparent to one skilled in the art should be seen, of course, as being within the scope of the invention.

What is claimed is:
1. A display device, comprising:
a plurality of first interconnects extending in a first direction and arranged in a second direction intersecting the first direction;
a plurality of second interconnects extending in the second direction and arranged in the first direction;
a plurality of switch elements, each of the switch elements being electrically connected to one selected from the first interconnects and one selected from the second interconnects;
a plurality of pixel electrodes electrically connected respectively to the switch elements;
a plurality of third interconnects extending in a third direction and arranged in a fourth direction, the third direction being parallel to a plane including the first direction and the second direction, the fourth direction intersecting the third direction and being parallel to the plane;
a first insulating layer provided between the second interconnects and the third interconnects;
a plurality of fourth interconnects separated from the first to third interconnects, the switch elements, and the pixel electrodes in a fifth direction, the fifth direction being perpendicular to the plane, the fourth interconnects extending in the fourth direction and arranged in the third direction;
a display layer to perform an optical operation of at least one selected from a light emission and a change of an optical characteristic based on an electrical signal provided to the pixel electrodes, the display layer being provided between the pixel electrodes and the fourth interconnects; and
a control unit to perform:
a sense operation in a sensing interval, the sense operation including sensing an electrical characteristic between the fourth interconnects and a selected third interconnect of the third interconnects, the selected third interconnect being in a selected state;
a first display operation in a first display interval after the sensing interval, the first display operation including causing the display layer to perform the optical operation by controlling a potential of the pixel electrodes by supplying a first scanning signal to at least one selected from the first interconnects and setting the second interconnects to a display potential;
a second display operation in a second display interval prior to the sensing interval, the second display operation including causing the display layer to perform the optical operation by controlling the potential of the pixel electrodes by supplying a second scanning signal to at least one selected from the first interconnects and setting the second interconnects to the display potential; and
a pre-display operation in a pre-display interval after the sensing interval and prior to the first display interval, the pre-display operation including a first voltage application operation of setting at least one of the second interconnects to a pre-display potential, an absolute value of the pre-display potential being greater than an absolute value of the display potential.

2. The device according to claim 1, wherein, for each of the second interconnects,
an absolute value of a potential difference between the pre-display potential and a potential of the each of the second interconnects of the sensing interval is greater than an absolute value of a potential difference between the potential of the each of the second interconnects of the sensing interval and a potential of the each of the second interconnects of the first display interval and second display interval.

3. The device according to claim 1, wherein the pre-display potential is higher than a potential of the second interconnects of the sense operation.

4. The device according to claim 1, wherein
the pre-display operation further includes a second voltage application operation implemented after the first voltage application operation, and
the second voltage application operation includes setting the at least one of the second interconnects to a final potential of the second interconnects of an end of the second display interval.

5. The device according to claim 4, wherein, for each of the second interconnects,
an absolute value of a potential difference between the pre-display potential and a potential of the each of the second interconnects of the sensing interval is greater than an absolute value of a potential difference between the final potential and a potential of the each of the second interconnects of the second voltage application operation.

6. The device according to claim 4, wherein the pre-display potential changes according to the final potential.

7. The device according to claim 1, wherein the potential of the second interconnects of the sensing interval is equal to a potential of an unselected third interconnect of the third interconnects of the sensing interval, the unselected third interconnect being a third interconnect other than the selected third interconnect.

8. The device according to claim 1, wherein the potential of the second interconnects of the sensing interval is equal to a ground potential.

9. The device according to claim 1, wherein the third direction is parallel to the first direction.

10. The device according to claim 9, wherein
the first interconnects is divided into a plurality of groups, and each of the plurality of groups includes a mutually-adjacent plurality of the first interconnects, and
the third interconnects respectively overlap the groups when projected onto the plane.

11. The device according to claim 1, wherein
the third direction is parallel to the first direction,
the first interconnects is divided into a plurality of groups, and each of the plurality of groups includes a mutually-adjacent plurality of the first interconnects,
the third interconnects respectively overlap the plurality of groups when projected onto the plane,
the control unit further performs the second display operation in a second display interval prior to the sensing interval, the second display operation including supplying the second scanning signal to the first interconnects of the first interconnects included in a first group and supplying a second display signal to the second interconnects, and
the first display operation includes, in the first display interval, supplying the first scanning signal to the first interconnects included in a second group and supplying a first display signal to the second interconnects, the second group being adjacent to the first group.

12. The device according to claim 1, further comprising a second insulating layer,
at least a portion of the third interconnects being disposed between at least a portion of one selected from the pixel electrodes and at least a portion of one selected from the second interconnects,
the second insulating layer being disposed between the at least a portion of the third interconnects and the at least a portion of the one selected from the pixel electrodes.

13. The device according to claim 1, wherein
the display layer includes a liquid crystal, and
the optical operation includes the change of the optical characteristic.

14. The device according to claim 1, further comprising a second insulating layer,
at least a portion of the third interconnects being disposed between at least a portion of one selected from the pixel electrodes and at least a portion of one selected from the second interconnects,
the second insulating layer being disposed between the at least a portion of the third interconnects and the at least a portion of the one selected from the pixel electrodes,
each of the pixel electrodes including a plurality of portions separated from each other in the plane,
the display layer including a liquid crystal, and the optical operation including the change of the optical characteristic,
an alignment of the liquid crystal changing in the plane.

15. The device according to claim 14, wherein the alignment of the liquid crystal changes according to an electric field generated by the portions and the at least a portion of the third interconnects, the electric field having a component parallel to the plane.

16. The device according to claim 1, wherein the first insulating layer includes an organic material.

17. The device according to claim 1, wherein the first insulating layer includes at least one selected from an acrylic resin and a polyimide resin.

18. The device according to claim 1, wherein the fourth interconnects are light-transmissive.

19. The device according to claim 1, wherein
the pixel electrodes include a first color pixel electrode for a first color and a second color pixel electrode for a second color different from the first color,
the second interconnects include a first color interconnect and a second color interconnect, the first color interconnect being electrically connected to the first color pixel electrode via one selected from the switch elements, the second color interconnect being electrically connected to the second color pixel electrode via one other selected from the switch elements, and
the control unit performs the first voltage application operation simultaneously for the first color interconnect and the second color interconnect.

20. The device according to claim 1, wherein
the pixel electrodes include a first color pixel electrode for a first color and a second color pixel electrode for a second color different from the first color,
the second interconnects includes a first color interconnect and a second color interconnect, the first color interconnect being electrically connected to the first color pixel electrode via one selected from the switch elements, the second color interconnect being electrically connected to the second color pixel electrode via one other selected from the switch elements, and the control unit performs the first voltage application operation for the first color interconnect in a first interval and performs the first voltage application operation for the second color interconnect in a second interval after the first interval.

\* \* \* \* \*